(No Model.)

S. LORD.
FLOWER HOLDER.

No. 485,417. Patented Nov. 1, 1892.

WITNESSES:
W. M. Twitchell
C. Sedgwick

INVENTOR:
S. Lord
BY
Munn & Co.
ATTORNEYS

UNITED STATES PATENT OFFICE.

SILVIE LORD, OF NEW YORK, N. Y.

FLOWER-HOLDER.

SPECIFICATION forming part of Letters Patent No. 485,417, dated November 1, 1892.

Application filed March 14, 1892. Serial No. 424,789. (No model.)

*To all whom it may concern:*

Be it known that I, SILVIE LORD, of New York city, in the county and State of New York, have invented a new and Improved Flower-Holder, of which the following is a specification, reference being had to the annexed drawings, forming a part thereof, in which—

Figure 1:
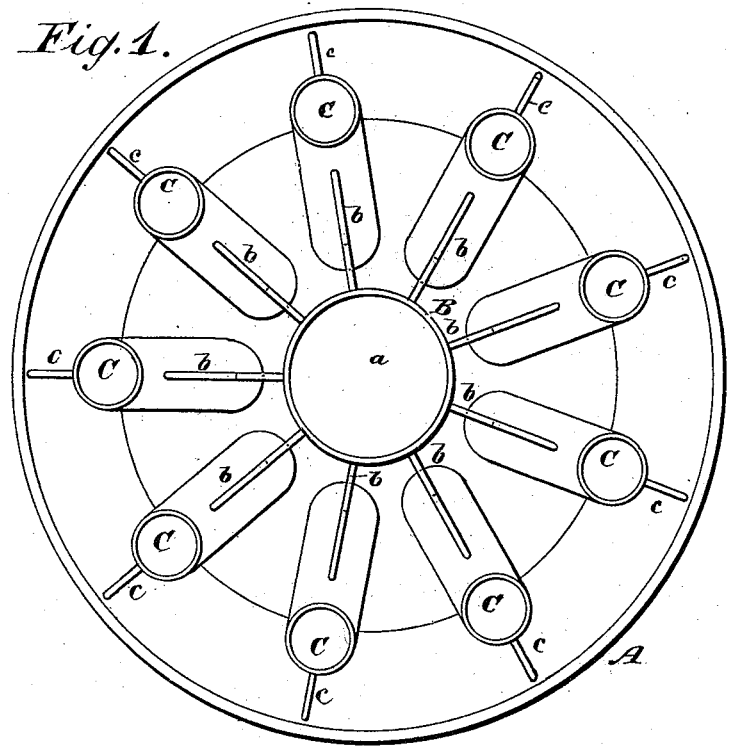
Figure 2:
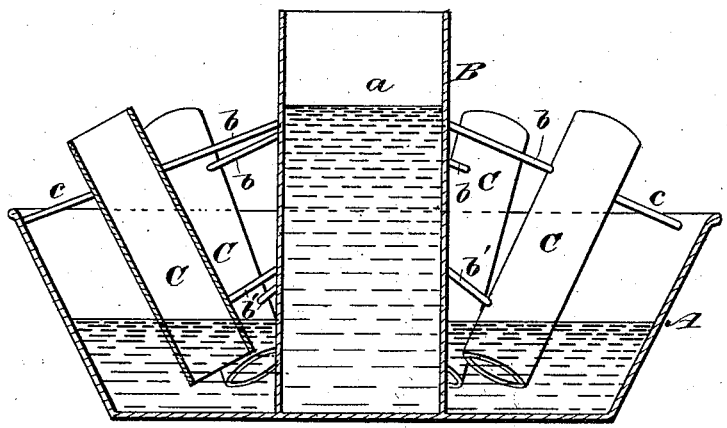

Figure 1 is a plan view of my improved flower-holder, and Fig. 2 is a vertical transverse section taken on a diametrical line.

Similar letters of reference indicate corresponding parts in both views.

In arranging in open dishes flowers having long stems much difficulty is experienced in holding them firmly in their places and in making a symmetrical mass. To obviate this difficulty and to provide a flower-holder which will support groups of flowers in a way apparently loose and natural, as if growing, and at the same time perfectly secure in the position in which they are placed, as well as afford them a due supply of water, are the objects of my invention.

My invention is constructed as hereinafter described.

The water-holding vessel A, forming the body of my improved flower-holder, may be of any desired shape. In the present case the vessel is made in the form of a circular pan with flaring sides. To the bottom of the vessel A at the center is secured a hollow cylinder B, forming the central compartment $a$ of the holder.

Arranged around the cylinder B and about midway between it and the walls of the vessel A are supported tubes C, which are preferably inclined outwardly away from the cylinder B. The said tubes C are held in position by wires $b\ b'$, attached to the cylinder B, and by wires $c$, attached to the tubes and to the outer walls of the vessel A. The tubes C extend nearly to the bottom of the vessel A and are open at the bottom, so that when the vessel A is filled or partly filled with water the water stands at the same level in the tube C. The flowers held by the central compartment $a$ form the middle portion of the group, and around these flowers are arranged other flowers, whose stalks are inserted in the tubes C and extend down into the water contained by the vessel A. In addition to the flowers contained by the compartment $a$ and the tubes C, other flowers may be inserted between the tubes and between the wires $b\ b'\ c$, the said wires serving to hold the stalks in a desired position and also to support the leaves.

Having thus described my invention, I claim as new and desire to secure by Letters Patent—

The improved flower-holder composed of the water-holding vessel A, the vertical water-holding compartment $a$, arranged centrally in said vessel and having a closed bottom, the series of elongated open-ended tubes C, arranged equidistantly around such central compartment, and the wires arranged as shown, whereby the said tubes are supported rigidly in the space between the central compartment and the side of the vessel with their open lower ends near the bottom of said vessel, all as hereinbefore specified.

SILVIE LORD.

Witnesses:
FANNY B. LORD,
DANIEL LORD, Jr.